July 6, 1965 C. A. KEATING 3,192,610
METHOD OF MAKING AN ELECTRON TUBE TERMINAL
Filed June 18, 1962 2 Sheets-Sheet 1

INVENTOR.
CHARLES A KEATING
BY Nathan Yompet
ATTORNEY

July 6, 1965 C. A. KEATING 3,192,610
METHOD OF MAKING AN ELECTRON TUBE TERMINAL
Filed June 18, 1962 2 Sheets-Sheet 2

INVENTOR.
CHARLES A. KEATING
BY Nathan Kompfed
ATTORNEY

United States Patent Office 3,192,610
Patented July 6, 1965

3,192,610
METHOD OF MAKING AN ELECTRON TUBE
TERMINAL
Charles A. Keating, Cannelton, Ind., assignor to General
Electric Company, a corporation of New York
Filed June 18, 1962, Ser. No. 203,359
1 Claim. (Cl. 29—155.55)

This invention relates to methods and apparatus for manufacturing electrical devices, and more particularly, to a method and apparatus for making a top-cap terminal for such devices. Briefly, the invention involves separating and removing excess wire from a lead wire projecting from the surface of an electrical element and for preparing said surface of the element and the remaining portion of wire for welding.

In the manufacture of electrical elements such as sealed electric discharge devices having a top cap serving as an electrode terminal thereof, it is necessary, during fabrication of such devices, to trim excess lead wire connected to an electrode of the device and projecting from the top cap and to firmly secure the wire to the top cap. Initially, in the assembly of the discharge device, the lead wire projects through the top cap and fits loosely therein. In order to secure the lead wire to the top cap, to facilitate electrical connection therefrom to external circuitry, it is desirable to weld the wire to the top cap. Heretofore, such excess lead wire has been removed, as by trimming with pincers or shears, resulting in the formation of sharp points or burrs which, during subsequent welding operations undesirably draw the welding arc thereto, resulting in burnout of the adjacent surface of the top cap, or in no useable weld at all.

Accordingly, it is a principal object of the invention to provide a novel and useful method for removing excess lead wire projecting from a surface of an electrical element and for preparing the surface adjacent the lead wire to provide a suitable surface for welding the remaining wire and the said surface together.

A further object is to provide a novel apparatus for removing excess lead wire and for forming the top cap material about the wire in a suitable welded connection.

In accordance with the method of the invention, the lead-wire to top-cap connection is accomplished by preliminarily breaking or fracturing the excess wire from a lead wire projecting from the surface of an electron discharge device and then forming or spinning the surface material of the top cap tightly about the remaining wire stub to provide a dome-shaped connection of the lead wire and the top cap.

In accordance with another aspect of my invention, I provide an apparatus comprising means to break or fracture the excess wire, a spring-loaded, motor-driven spinner mechanism engageable with the remaining wire stub and the surface from which it projects to spin the surface material tightly about the wire stub and to form the surface and wire stub into a smooth, dome-shaped connection thereof, and means for welding the lead wire to the surface of the top cap.

Other objects, features and many of the attendant advantages of the invention will be appreciated more readily as the same become better understood by reference to the following detailed description, when considered in connection with the accompanying drawings wherein.

Figure 1:
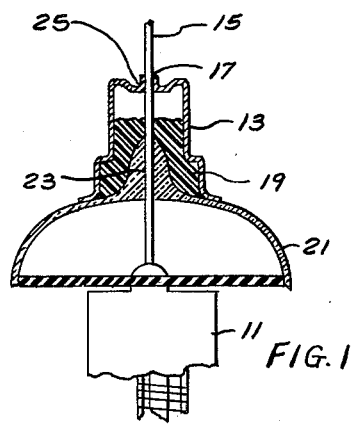
FIG. 1 is a cross-sectional fragmentary view of an electron discharge device showing the top-cap assembly of a sealed discharge device in a preliminary phase of assembly.

Referring to the drawings, and more particularly to FIG. 1, there is shown an electrical element 11 which may be an anode or other electrode of a sealed discharge device tube type having a top cap 13 and a lead wire or top cap wire 15 projecting from the top surface of the top cap. The tube type may otherwise be of any conventional construction, such as that shown and described in U.S. Patent No. 2,857,544 of J. F. Stephens, patented October 21, 1958 and assigned to the assignee of this application. The invention, it will be understood, is equally applicable to any other tube type wherein a top-cap terminal or electrode connection is required or desired.

The top cap wire 15 fits loosely within the opening 17 of the top cap 13 during assembly and fabrication of the tube and when the fabrication of the tube is completed, the top cap wire 15 should be firmly, tightly, and conductively secured to the top cap 13. The cap 13 is a metallic cup-shaped member of suitable material, such as brass, and is secured to the envelope 21 of the tube by any suitable cement 19. The wire 15, after being hermetically sealed in the envelope 21, as at 23, is, as noted, threaded through the opening 17 of the cap 13 formed at the upper surface of the cap. As shown, the opening 17 is provided by an upstanding sleeve or tubular projection 25 formed in the top surface of the cap 13.

Figure 2A:
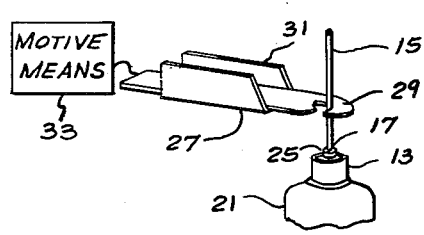
FIGS. 2a to 2e illustrate the steps in removing the excess lead wire projecting from the top cap of the sealed device during fabrication.
Figure 2B:
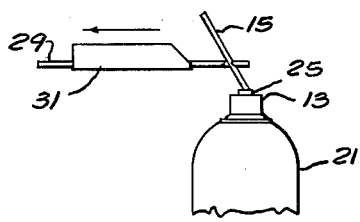
Figure 2C:
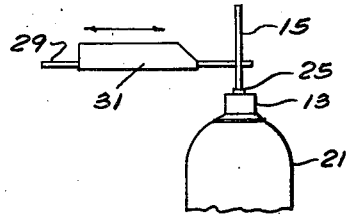
Figure 2D:
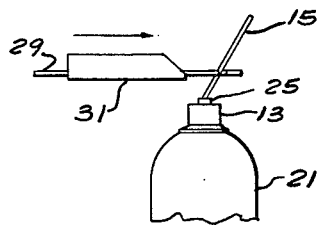
Figure 2E:
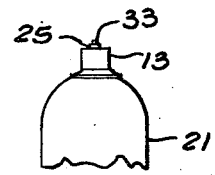

A preliminary step in securing the top cap wire 15 to the top cap 13 is the removal of the excess wire projecting from teh top surface of the top cap through aperture 17. The sequence of operations in removing the excess top-cap wire is illustrated in FIGS. 2a–2e. FIG. 2a illustrates a wire breaking and removing means 27, which may comprise a hook-shaped finger 29 into the hooked portion of which the top cap wire can be engaged. The breaking means, including the finger 27, is mounted so as to be movable to and fro, in an oscillatory manner, to bend the top cap wire 15 backwards and forwards to break off the excess wire at a point beyond and adjacent the opening 17 of projection 25. The finger 29 is mounted on a slide 31 and can be operated by any conventional motive means 33, such as for example, air cylinders or motor-driven cams and linkages which operates the breaking means to move the lead wire to one extreme position, as illustrated in FIG. 2b; and to the other extreme position as shown in FIG. 2d, moving the wire back and forth through the mean position of FIG. 2c, ultimately to break off the excess wire close to and just beyond the top cap. FIG. 2e, shows the top cap wire broken off and discarded, leaving a remaining or residual stub 33, which projects slightly beyond the top surface of the sleeve 25 of cap 13.

The free end of the stud 33 is generally in the form of sharp points or burrs which present a rough surface unsuitable for welding. If an attempt is made to weld the stub 33 to the top cap 13, the sharp points or burrs of the stub 33 would draw the welding arc thereto and could result in a burn-out of the top surface of the top cap, or no useable weld at all.

Figures 3A, 3B:
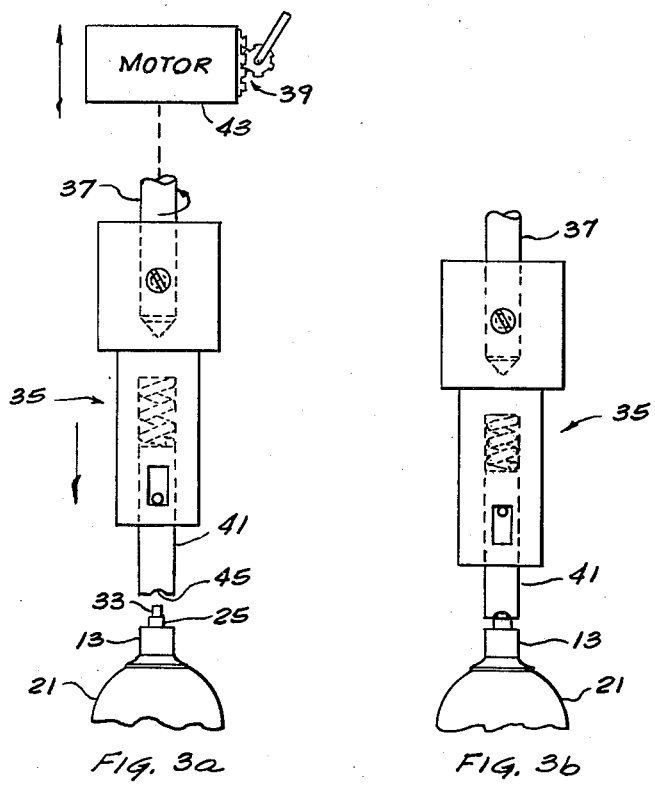
FIGS. 3a to 3c illustrate the operation of a spinner mechanism engaging the remaining top-cap wire and the top cap itself to form the top-cap material about the remaining wire.
Figure 3C:
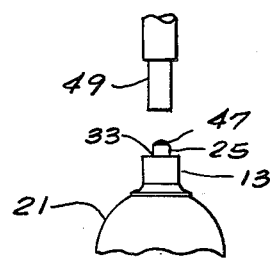

In the next operation, illustrated by FIGS. 3a to 3c, the stub 33 and the top cap 13 and sleeve 25 from which it projects are engaged by a spinner 35, which may be in the form of a motor-driven, spring-loaded mechanism, as shown, and which forms the top cap material tightly around the stud 33 into a dome-shaped surface, which presents a suitable surface for welding the top cap wire to the top cap material.

The spinner mechanism 35 can comprise a rotatable motor shaft 37 that is also translatable by means of a rack and pinion 39 toward and away from the top cap to actuate a spring-loaded plunger 41, causing the latter to engage the stub 33 and the top cap projection 25 from which it projects. Any suitable arrangement for producing rotation of the spinner 35 and for causing translatory movement thereof can be used. For example, the motor 43 rotates the spinner and the rack and pinion 39 affixed to the motor housing causes predetermined translation of the spinner mechanism.

At the end of the spring-loaded plunger 41, there is provided a dome-shaped die 45, into the hollow of which the top cap can be received. Thus, when the plunger 41 engages the stub 33 and the top cap projection 25 from which it projects, a dome-shaped surface 47 (FIG. 3c) is formed, having a radius equal to the radius of the dome-shaped die 45. With the top cap material thus firmly and tightly spun about the stub 33, the dome-shaped surface 47 is prepared to receive a weld from any conventional welding electrode 49, which completes the connection of the top cap wire and the top cap.

It should be noted that an additional advantage is derived from breaking the wire instead of cutting the wire, in those instances where the wire is formed with a copper sheath and an iron or other core. As the wire is bent in the breaking operation, the core breaks first and the copper stretches slightly over the core material, forming the stud 33. The stretched copper sheath more easily cooperates with the dome-shaped die 45 of the spinner 35 than does the free end of a residual stud that would be formed when a cutting or shearing process is used to remove the excess top cap wire.

The entire operation as hereinbefore described can be combined in an apparatus in which a plurality of discharge devices or electrical elements can, if desired, be mounted on a movable turntable, or turret (not shown), which can be indexed to a first position in which the breaking means engages the top cap wire, bends it, breaks it off and be followed by an indexing of the discharge device on the turntable to a second position where a spinner or some other means for working the metal will engage the residual stub of the top-cap wire and the top-cap material and firmly secure the top-cap material about the top-cap wire. In the final stage of operation, the turntable or turret is indexed to a third position where a welder will complete the connection of top-cap wire and the top-cap material.

Although a particular embodiment of the subject invention has been described, many modifications may be made and it is understood to be the intention of the appended claim to cover all such modifications that fall within the true spirit and scope of the invention.

What I claim as new and desire to secure by Letters Patent of the United States is:

In the manufacture of an electron discharge device having a plurality of electrodes and a lead wire extending from one of said electrodes through the envelope of the device, which lead wire is of composite structure having an iron core and a copper sheath enveloping the core, the method of forming a top cap connection for said lead wire comprising the steps of securing an apertured metallic cap to said envelope at the part thereof at which the lead projects exteriorly of the envelope, threading said lead through the aperture of said cap, repeatedly bending said lead against the walls of said aperture to break the iron core and copper sheath thereat while streaching the copper sheath beyond the broken end of the iron core, forming the broken end of the wire to provide a copper-domed end of wire to facilitate welding to the wall of the aperture and welding the broken end of the wire to the top cap.

References Cited by the Examiner
UNITED STATES PATENTS

| | | | |
|---|---|---|---|
| 1,081,451 | 12/13 | Kerk | 29—160.6 |
| 2,331,526 | 10/43 | Wappler | 339—145 |
| 2,397,347 | 3/46 | Gruner | 225—103 |
| 2,568,438 | 9/51 | Friedman | 225—103 |
| 2,736,873 | 2/56 | Bechard et al. | 339—146 |
| 2,749,528 | 6/56 | Albrecht | 339—145 |
| 2,841,690 | 7/58 | Kuebler | 339—145 |
| 2,970,731 | 2/61 | Miller et al. | 225—93 |
| 3,100,330 | 8/63 | Rice et al. | 29—155.55 |
| 3,126,619 | 3/64 | Brent | 29—155.55 |

WHITMORE A. WILTZ, *Primary Examiner.*

FRANK E. BAILEY, JOHN F. CAMPBELL, *Examiners.*